Aug. 28, 1951     H. E. JACOBSON     2,565,853
MACHINE TOOL GAUGING DEVICE

Filed Nov. 12, 1947     2 Sheets-Sheet 1

Inventor:
Harold E. Jacobson,
By Clinton, Schroeder, Merriam, Hoffgren,
Attys.

Aug. 28, 1951  H. E. JACOBSON  2,565,853
MACHINE TOOL GAUGING DEVICE
Filed Nov. 12, 1947  2 Sheets-Sheet 2
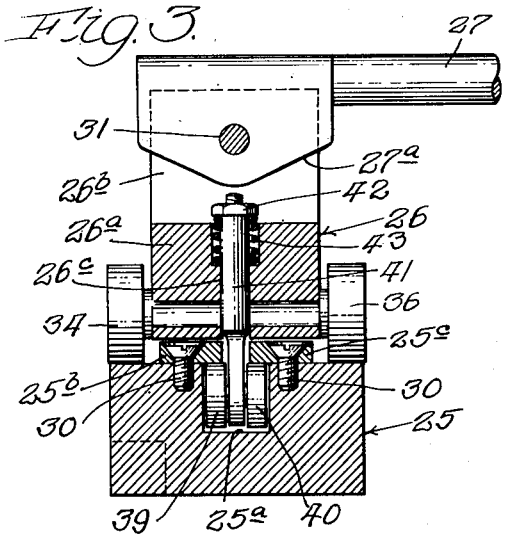
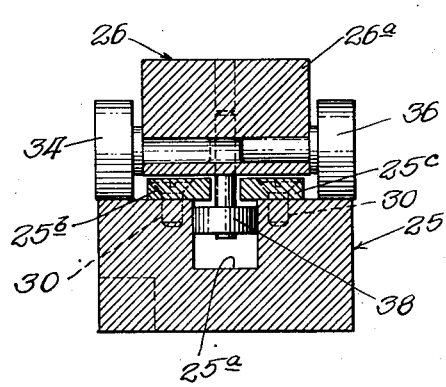
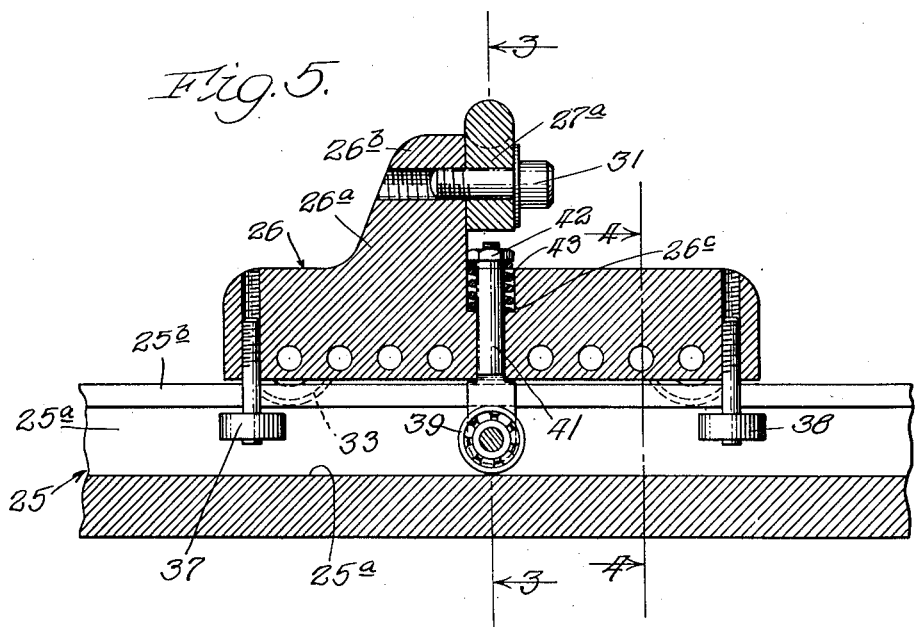
Inventor:
Harold E. Jacobson,
By Christy, Schroeder, Merriam & Hofgren,
Attys.

Patented Aug. 28, 1951

2,565,853

UNITED STATES PATENT OFFICE 2,565,853

MACHINE-TOOL GAUGING DEVICE

Harold E. Jacobson, Delavan, Wis.

Application November 12, 1947, Serial No. 785,355

2 Claims. (Cl. 308—6)

This invention relates to a machine tool gauging device, and more particularly to a precision machine tool gauging device for use with a table having a work supporting surface.

In the manufacture of such apparatus as jigs, dies, tapping heads, etc., wherein a work-piece is drilled or otherwise milled with great precision in order to form a jig, die or other tool, it is necessary to align the work-piece with great precision on a machine table, as for example the table of a jig borer or jig grinder.

In the past it was customary to mount an indicator or feeler gauge in a stationary position on the machine with the actuating finger of the gauge against one side of the work-piece and then to move the table of the machine back and forth to determine whether the edge of the work-piece was aligned with the necessary precision. By moving the table back and forth a considerable number of times and tapping the work-piece with a mallet, or moving the work-piece a very slight amount in some other manner, the work-piece was aligned with the necessary precision and clamped tightly to the table. However, in performing this necessary aligning operation the lead screws for moving the table and the guideways along which the table is moved may get several times the wear that they do in the actual boring or grinding operation; and since a jig borer or jig grinder is a precision machine having an initially high cost, but which is of little or no value if its precision parts wear more than a few ten-thousandths of an inch, this initial alignment process is an important factor in the life of the machines.

I have devised and am herewith disclosing and claiming a machine tool gauging device adapted to be bolted or otherwise affixed to an edge of the table of a jig borer, jig grinder or other machine having a work supporting surface. My device entirely eliminates the necessity for moving the table of the machine back and forth during the above described alignment operation. Since my device can be manufactured and sold for only a very small fraction of the cost of a jig borer, jig grinder or similar machine, the device may be discarded and replaced when it is worn to an extent that a desired precision or accuracy is no longer obtainable instead of replacing the machine itself.

Basically my device comprises a member which is adapted to be mounted on an edge of the work table of a conventional machine of the type noted above, said member having a track thereon. A carriage is movably mounted on the track, said carriage being adapted to carry a gauge; and apparatus is provided for maintaining the carriage in desired relation to the track so that a work-piece may be aligned on the table with an accuracy within about 1/10,000 of an inch (which is at least as good as the accuracy of the ordinary jig borer or jig grinder) without moving the table of the machine, so that the only wear received by the movable parts of the machine occurs in the actual boring, grinding or milling operations.

One feature of my invention is that it provides a machine tool gauging device for use with a table having a work supporting surface, said device permitting precision alignment of a work-piece on said surface without moving said table.

Another feature of my invention is that it provides a machine tool gauging device comprising a track, a carriage movable along said track, a guide on said carriage engaging said track, and a separate guide for maintaining the carriage in desired relation to said track to obtain a precision measurement.

Still a further feature of my invention is that the carriage includes a plurality of guides which extend from opposite sides of said carriage, the guides which extend from one side being offset with respect to the guides which extend from the other side for minimizing the effect of slight irregularities in the track.

Yet another feature of my invention is that it provides a machine tool gauging device comprising a track member having an undercut longitudinal channel, a carriage movably mounted on said member, a plurality of guides on said carriage for engaging the track, and another guide engaging the inner surface of the undercut portion of said channel for maintaining the carriage in desired relation to the track.

Other features and advantages of my invention will be apparent from the following specification and from the drawings in which:

Fig. 3 is a transverse section through the machine tool gauging device along the line 3—3 of Fig. 5;

Fig. 4 is a transverse section through the device along the line 4—4 of Fig. 5; and Fig. 5 is an enlarged fragmentary longitudinal section taken along the line 5—5 of Fig. 2.

Figure 1:
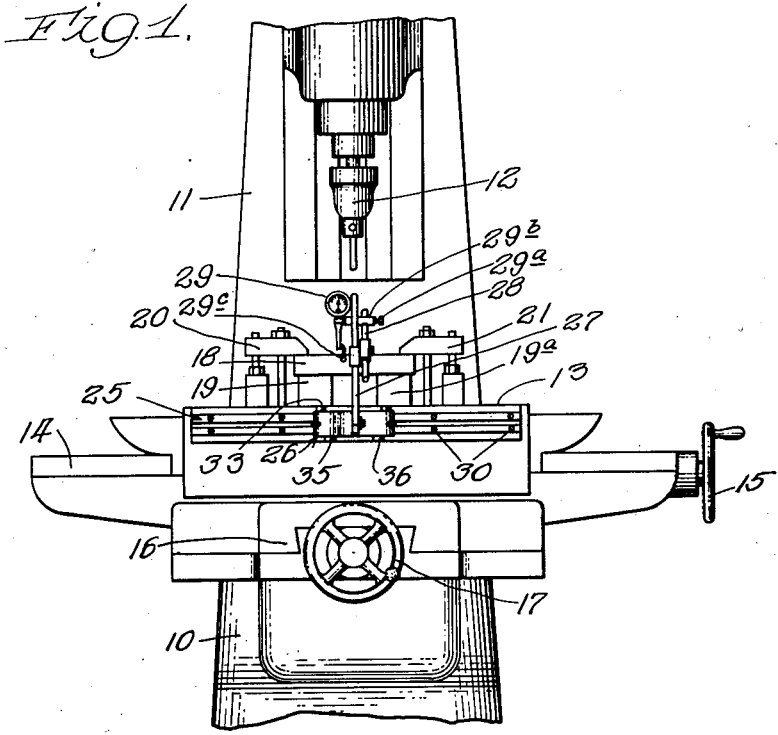
Fig. 1 is a fragmentary view of a conventional jig borer having my machine tool gauging device mounted thereon.

Referring now to the drawings, Fig. 1 shows a machine adapted for precision work, here illustrated as a jig borer comprising a base 10 having a mounting column 11 which carries a drilling device 12. The machine includes a table 13 having a horizontal work supporting surface, said table being longitudinally movable in a channel or guideway 14 by means of a lead screw (not shown) operable by a handwheel 15. The table is also transversely movable in a channel or guideway 16 by means of a lead screw (not shown) operable by a handwheel 17. A work-piece 18 upon which it is desired to perform certain precision drilling or other operations is shown clamped on the table on riser blocks 19 and 19a, said work-piece being held in position by means of clamps 20 and 21.

As pointed out earlier in this specification, in order to obtain the desired precision in making a jig, die or other tool, it is necessary to align the work-piece 18 with great precision, as for example within one or two ten-thousandths of an inch. While this may be accomplished by turning wheel 15 to run the table back and forth, meanwhile gauging and moving the work-piece until the correct alignment is obtained, each back and forth movement of the table 13 results in wear to the machine, and eventually the machine no longer has the necessary accuracy for precision work.

My machine tool gauging device comprises briefly a member designated generally at 25, this member having a track thereon and being adapted to be bolted or otherwise securely affixed to an edge (the front edge as illustrated) of the table 13; a carriage designated generally at 26 movably mounted on said track; apparatus for maintaining the carriage in desired relation to the track; and arms 27 and 28 adjustably but lockably mounted on said carriage and adapted to hold a gauge 29.

In a machine of the character referred to here at least the front edge of the table 13 is always machined until it is accurately parallel to the longitudinal path of movement of the table, this arrangement being made for purposes other than that of my invention. Consequently, when the member 25 is bolted to the edge of the table adjacent the surface on which the work-piece 18 is mounted, the longitudinal track on said member may be made to extend exactly parallel to the path of longitudinal movement of the table 13. While means other than bolts may be utilized for securing the member 25 to the table the front of the table usually is provided with holes, and I find it convenient to utilize these holes for bolts (not shown) to secure the member 25 to the table.

As shown best in Figs. 3 and 4, the member 25 is preferably rectangular in cross section and is accurately machined to provide the desired accuracy. Said member has in its outer surface an undercut longitudinal channel 25a. While any conventional machining operation may be utilized to provide this undercut channel, I prefer to provide a simple U-shaped channel in the outer surface of the member 25 and then to secure a pair of parallel spaced members 25b and 25c along the edges of and overlapping this channel as shown in Figs. 3 and 4. The members 25b and 25c are affixed to the edges of the channel by means of a plurality of studs 30, thus providing the desired undercut channel by a very simple and efficient means.

Figure 2:
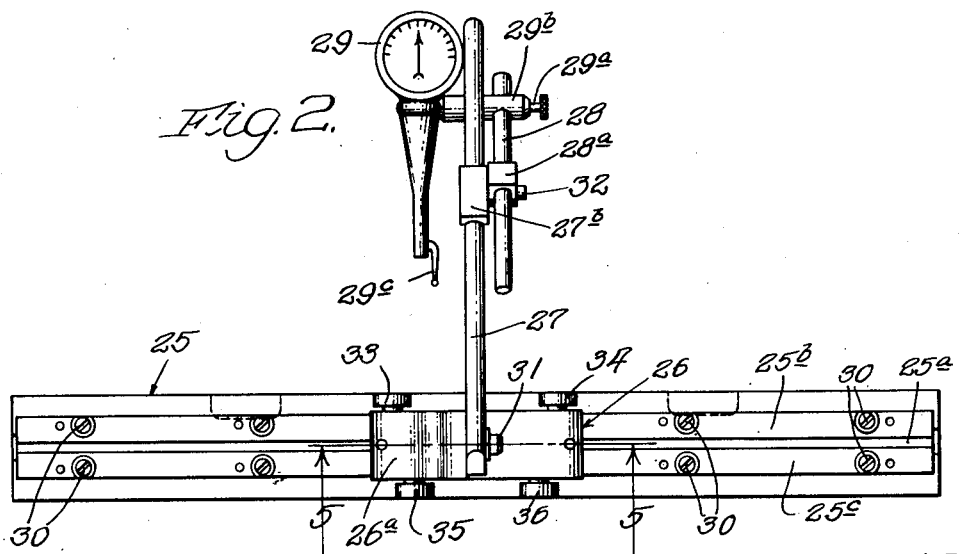
Fig. 2 is an enlarged view of the machine tool gauging device in operative arrangement.

The carriage 26 comprises a base portion 26a having an ear or flange 26b upstanding from adjacent the center thereof. This flange is drilled to receive a stud 31 upon which is mounted the arm 27, said arm being pivotal about the stud on a bracket 27a so that the arm may be adjusted to a desired position, and the stud may be tightened to lock the arm in this position. A mounting bracket 27b which is slidable on the arm 27 is lockably secured to another mounting bracket 28a which is slidable on the arm 28 by means of a stud 32, this arrangement adjustably joining said arms to provide a lockable adjustment for the indicator or feeler gauge 29. As seen in Fig. 2 the gauge is secured by means of a set screw 29a on the end of the arm 28, this end preferably being reduced to receive a shank 29b of the gauge. The gauge includes an actuating finger 29c which is moved along the edge of the work-piece 18 during the aligning operation.

The carriage also includes guides engaging the member 25. As illustrated, these guides comprise four ball bearing mounted wheels 33—36 which engage the outer surface of the member 25. Obviously, guides providing a sliding contact rather than a rolling contact may be maintained if desired, and three rather than four guide members may be employed if desired so long as at least two of said guides extend from one side of the carriage and at least one of said guides extends from the opposite side of the carriage. I prefer that the guides which extend from one side of the carriage be offset from the guides which extend from the opposite side of the carriage, this construction being clearly shown in Fig. 2. With this offset construction any slight irregularities or variations in the surface of the track level are minimized since only one of the guides contacts such variation at any given time. A pair of guides, here shown as rotatable wheel members 37 and 38, are also mounted on said carriage, as shown in Fig. 4, and engage a wall of the channel 25a. These guides extend from opposite ends of the body 26a and ride on the bottom wall of the channel 25a when the apparatus is in operative position, thus preventing the wheels 33—36 from sliding off the vertical outer surface of the member 25.

In order to maintain the carriage in desired relation to the track I also provide another guide, this being illustrated as a pair of ball bearing mounted wheels 39 and 40 extending from the carriage adjacent the center thereof and engaging the inner surface of the undercut portion of the channel 25a, this being a surface of the spaced members 25b and 25c in the construction illustrated. In order to provide tight engagement with the inner surface of the undercut portion of said channel, the wheels 39 and 40 are mounted upon an axially movable shaft member 41, this member extending through the body portion 26a of the carriage 26 and terminating in a nut 42. A spring 43 surrounds the upper portion of the shaft 41, one end of said spring abutting the nut 42 and the other end of the spring abutting a shoulder 26c formed in the body 26a of the carriage.

In operation it will be seen that the carriage 26 is readily movable along the track provided in the member 25, the carriage travelling in a path exactly parallel to the path of longitudinal movement of the table 13. When the work-piece 18 is mounted on the table, the arms 27 and 28 are adjusted so that the actuating finger 29c of the feeler gauge 29 contacts the edge of the work-piece 18, and the arms are then locked in place. The carriage may then be moved back and forth along the track so that the finger 29c moves along the entire length of the work-piece, and the position of the work-piece may be adjusted to obtain the desired precision alignment. During this operation the table 13 is never moved, so that the only wear that the machine with which my device is associated receives is during the actual drilling, grinding or other operation. When the carriage has been used for such a long period that normal wear causes a loss of accuracy the member 25 may be removed from the table 13 and the entire device may be discarded and replaced with a new device at only a very small fraction of the cost of replacing the entire machine, and since the table 13 is moved only during the actual drilling or milling operations, the machine retains its initial accuracy for a much longer time than has heretofore been possible.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described, comprising: a generally rectangular carriage; a plurality of wheels on said carriage, one being positioned adjacent each corner thereof for moving said carriage along a track; a pair of roller guides suspended beneath said carriage respectively adjacent the front and rear ends thereof positioned to exert force in horizontal directions at right angles to the direction of movement of said carriage by engagement with vertical walls in the track; a roller guide suspended beneath said carriage adjacent the center thereof positioned to exert force in a vertical direction by engagement with the bottom surface of a horizontal portion of the track; and spring means yieldably biasing said last mentioned roller guide toward said carriage.

2. Apparatus of the character claimed in claim 1, wherein the wheels on said carriage are offset, the wheels on one side being closer to the center of the carriage than the wheels on the other side.

HAROLD E. JACOBSON.

REFERENCES CITED

The following references are of record in the file of this patent:

UNITED STATES PATENTS

| Number | Name | Date |
|---|---|---|
| 1,507,723 | Avery | Sept. 9, 1924 |
| 1,613,866 | Avery | Jan. 11, 1927 |
| 1,847,976 | Oldham | Mar. 1, 1932 |
| 1,889,112 | Shoemaker | Nov. 29, 1932 |
| 1,910,534 | Glasner | May 23, 1933 |
| 2,359,018 | Balk | Sept. 26, 1944 |
| 2,387,859 | Schmidt | Oct. 30, 1945 |